United States Patent
Shotey et al.

(10) Patent No.: US 8,579,135 B1
(45) Date of Patent: Nov. 12, 2013

(54) ELECTRICAL BOX

(75) Inventors: Marcus J. Shotey, Scottsdale, AZ (US);
Jeffrey P. Baldwin, Phoenix, AZ (US);
Iven Dieterle, Tempe, AZ (US);
Richard L. Cleghorn, Tempe, AZ (US);
Thomas A. Miserendino, Gilbert, AZ (US); John Klein, Gilbert, AZ (US)

(73) Assignee: Hubbell Incorporated, Shelton, CT (US)

( * ) Notice: Subject to any disclaimer, the term of this patent is extended or adjusted under 35 U.S.C. 154(b) by 78 days.

(21) Appl. No.: 13/024,841

(22) Filed: Feb. 10, 2011

Related U.S. Application Data

(60) Provisional application No. 61/303,550, filed on Feb. 11, 2010.

(51) Int. Cl.
*H02G 3/08* (2006.01)

(52) U.S. Cl.
USPC .......................................................... 220/3.6

(58) Field of Classification Search
USPC ..................... 220/3.2–3.7; 174/53, 54, 57, 58
See application file for complete search history.

(56) References Cited

U.S. PATENT DOCUMENTS

| | | | | |
|---|---|---|---|---|
| 1,957,003 | A | * | 5/1934 | Selen .............................. 220/3.6 |
| 2,299,696 | A | * | 10/1942 | Gregersen ...................... 220/3.6 |
| 2,772,062 | A | * | 11/1956 | Bowser ......................... 248/27.1 |
| 2,970,713 | A | * | 2/1961 | Kellberg et al. ............... 220/3.6 |
| 2,971,666 | A | * | 2/1961 | Randall .......................... 220/3.6 |
| 4,163,501 | A | * | 8/1979 | Lass ............................... 220/3.6 |
| 5,012,043 | A | | 4/1991 | Seymour |
| 5,434,359 | A | * | 7/1995 | Schnell ........................... 174/58 |
| 7,173,194 | B2 | * | 2/2007 | Rupert .......................... 174/480 |
| 7,312,395 | B1 | | 12/2007 | Gretz |
| 7,531,743 | B2 | | 5/2009 | Johnson et al. |
| 7,544,889 | B1 | | 6/2009 | Sanchez |
| 7,582,827 | B1 | | 9/2009 | Gretz |

\* cited by examiner

*Primary Examiner* — Harry Grosso
(74) *Attorney, Agent, or Firm* — Alfred N. Goodman; Mark S. Bicks; Alan I. Cantor

(57) ABSTRACT

An electrical box including at least four walls extending forward from a back wall to an open front, at least two opposing walls of the four walls each including a rear mounting tab and a front mounting tab, wherein each of the rear mounting tabs are rigidly mounted to the wall and each of the front mounting tabs are pivotably mounted to the electrical box.

16 Claims, 4 Drawing Sheets

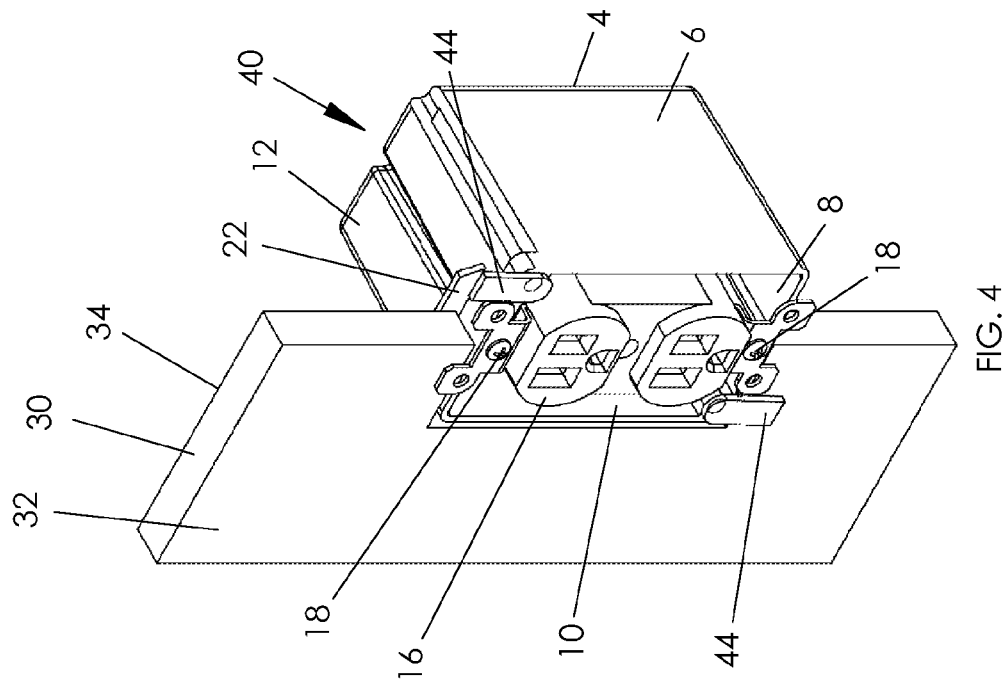
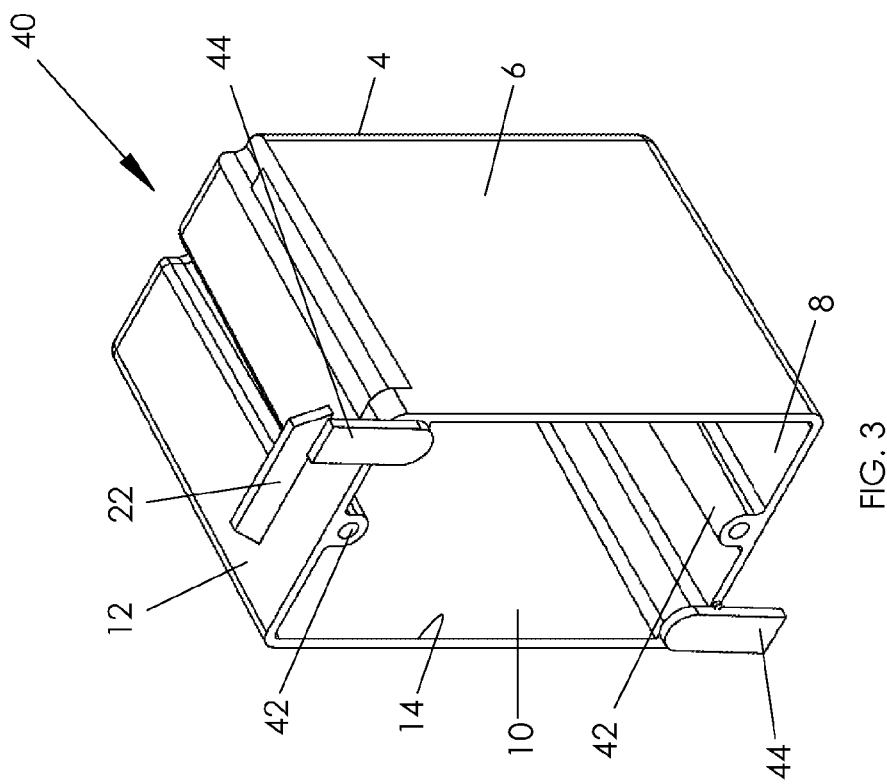

ELECTRICAL BOX

CROSS REFERENCE TO RELATED APPLICATIONS

This Application claims the benefit of the filing date of U.S. Provisional Patent Application 61/303,550 to Baldwin et al. entitled "Electrical Boxes" which was filed on Feb. 11, 2010, the disclosure of which is hereby incorporated herein by reference.

BACKGROUND

1. Technical Field

Aspects of this document relate generally to electrical boxes.

2. Background Art

Electrical boxes are conventionally used to mount and house one or more electrical devices within a wall or other structure. Such conventional electrical boxes typically consist of a generally box-shaped structure that is mounted to a wall stud or other interior wall structure via one or more nails, screws, or other fastening devices. An electrical box is typically a one-piece structure and contains an opening for an electrical device or connector which is typically installed within the box after the box is mounted within a wall.

SUMMARY

This disclosure includes one or more electrical boxes for securing electrical devices within a wall.

A particular aspect broadly includes an electrical box including at least four walls extending from a back wall to an open front, at least two opposing walls of the four walls each including a rear mounting tab and a front mounting tab, and wherein each of the rear mounting tabs are rigidly mounted to the electrical box.

In particular implementations, each of the rear mounting tabs further includes at least one mounting aperture. The mounting aperture may be threaded. The front mounting tab may further include at least one mounting aperture. The front and rear mounting tabs may be the same width as the at least two opposing walls. The front mounting tab may pivot from a position generally parallel with the two opposing walls to a position generally perpendicular to the two opposing walls.

In additional particular implementations, the rear mounting tab may be positioned adjacent a mounting wall rear surface. The front mounting tab may be positioned adjacent a mounting wall front surface. The mounting wall may be located between the front and rear mounting tabs. The front mounting tabs may be located on walls opposite the rear mounting tabs. The front and rear mounting tabs may be located on a top wall and a bottom wall. The front mounting tabs may define a portion of the open front. Each of the front mounting tabs may be secured to an inner surface of the wall.

A particular aspect may broadly include an electrical box including at least four walls extending forward from a back wall to an open front, at least two opposing walls of the four walls each comprising a rear mounting tab and a front mounting tab, and wherein each of the rear mounting tabs are mounted to the wall and each of the front mounting tabs are pivotably mounted to the electrical box.

In particular implementations, the rear mounting tabs may be slidable on the wall. Each of the front mounting tabs may be secured to an inner surface of the wall. Each of the rear mounting tabs and each of the front mounting tabs may further include at least one mounting aperture.

A particular aspect may include a method of installing an electrical box including the steps of providing the electrical box having at least four walls extending forward from a back wall to an open front, at least two opposing walls of the four walls each including a front and rear mounting tab, cutting a hole in a mounting wall sized to receive the electrical box, inserting the electrical box within the mounting wall opening until the rear mounting tabs are behind the mounting wall, orienting the electrical box to permit the rear mounting tabs to contact a rear surface of the mounting wall, moving the electrical box to a position where the rear mounting tab contacts the mounting wall, pivoting the front mounting tab into contact with the mounting wall, and securing the electrical box with a fastener through the front and rear mounting tabs.

In particular implementations, the step of cutting may include removing a portion of the mounting wall to receive the fastener.

BRIEF DESCRIPTION OF THE DRAWINGS

Features of particular embodiments and implementations of electrical boxes will hereinafter be described in conjunction with the appended drawings, where like designations denote like elements, and:

FIG. 3 is a perspective view of an electrical box with a pivotable mounting tab;

FIG. 4 is a perspective view of an electrical box with a pivotable mounting tab mounted on a mounting wall;

DETAILED DESCRIPTION

Accordingly, there are a variety of electrical boxes.

Figure 1:
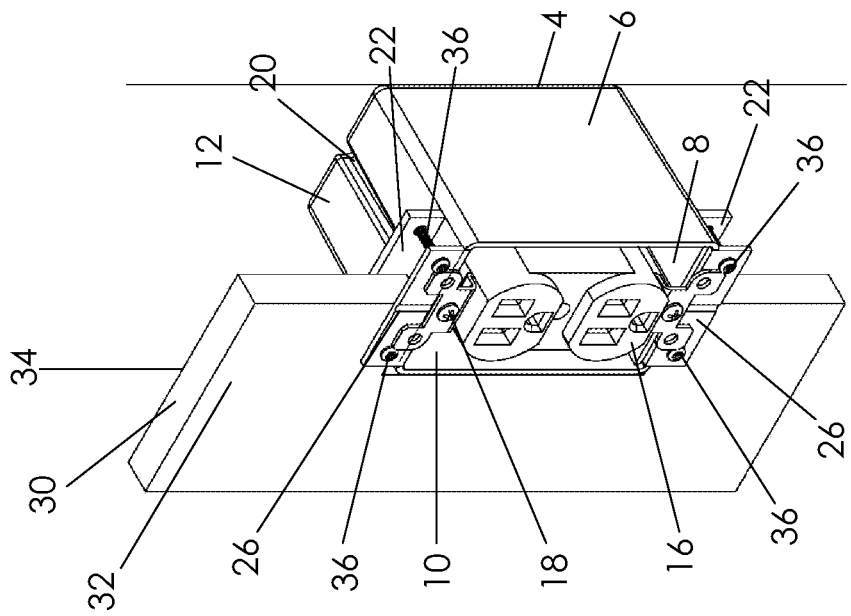
FIG. 1 is a perspective view of an electrical box with a hinge.
Figure 2:
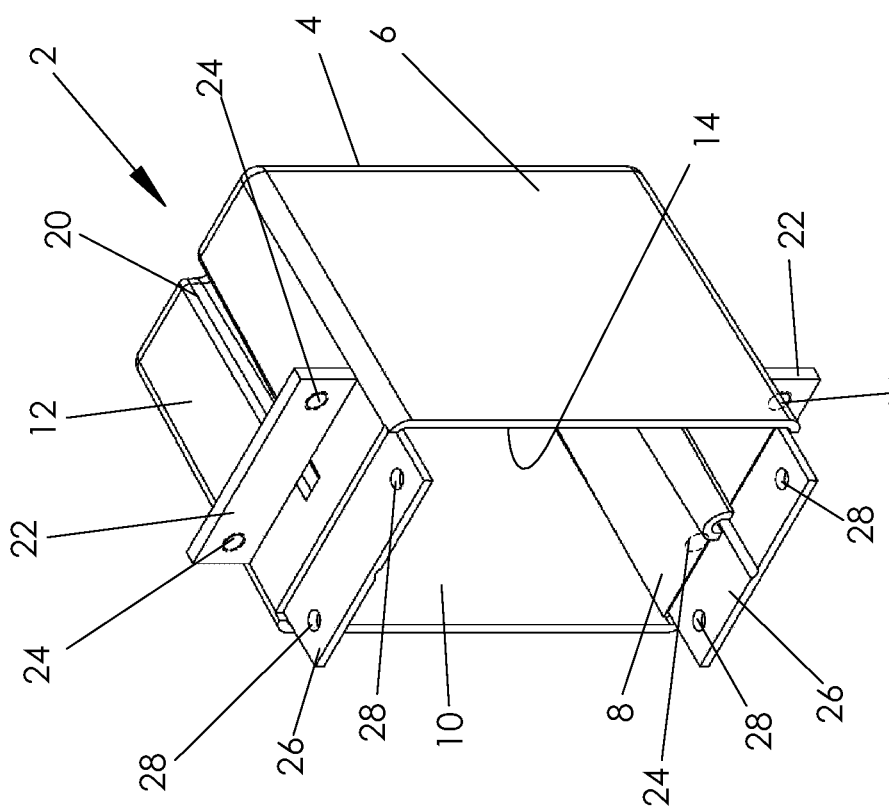
FIG. 2 is a perspective view of an electrical box with a hinge mounted on a mounting wall.

FIGS. 1 and 2 illustrate an electrical box 2 with a back wall 4 and a right wall 6, a bottom wall 8, a left wall 10, and a top wall 12 extending forward from the back wall. Walls 4-12 define an open front 14 arranged to receive an electrical device 16 therein with mounting screws 18. Top wall 12 and bottom wall 8 may each include a channel 20 extending inward from each wall into the open front 14.

A rear mounting tab 22 may be secured on an outer surface of top wall 12 and bottom wall 8. Rear mounting tab 22 is approximately the same width as bottom wall 8 and top wall 12 and includes a pair of apertures 24 in each of the mounting tabs. Each of the rear mounting tabs is set back from open front 14 a specified amount approximately equal to the drywall thickness, generally one-half of an inch. Nevertheless, a number of various electrical boxes may be manufactured with the distance between the open front 14 and the mounting tabs 22 varied depending on the thickness of the drywall where the electrical box will be installed.

Electrical box 2 may also include a front mounting tab 26 which may include apertures 28 which align with rear mounting tab apertures 24 when the front mounting tab is pivoted from a position parallel to the top wall to a position perpendicular to the top wall. Advantageously, when the front mounting tab is in the position parallel to the top or bottom wall, the front mounting tab extends the front surface out slightly and forms at least a portion of the open front.

As is particularly seen in FIG. 2, a mounting wall 30 includes a front surface 32 and a rear surface 34. After a hole is cut in the mounting wall, slightly larger than the electrical box (excluding the mounting tabs), the electrical box is positioned with the rear mounting tab adjacent and contacting the rear surface 32 of mounting wall 30. The front mounting tab 26 is then pivoted from the parallel position to the perpendicular position, so that apertures 24 are aligned with apertures 28. Preferably, the installer has already removed enough material so that fasteners 36 may be passed through apertures 28 in front mounting tab 26, drywall 30, and threaded into apertures 24 in rear mounting tab 22. Thus, it is seen that the installer can easily and effectively mount an old style work box on the drywall by pivoting the front mounting tab into position so that the front and rear mounting tabs are on both sides of the drywall. In another aspect, a cut-out template may be included with the electrical box that includes holes or channels arranged to ensure that the fasteners can pass through the drywall.

FIGS. 3 and 4 illustrate a second aspect electrical box 40 with back wall 4, right wall 6, bottom wall 8, and a top wall 12 at least partially defining open top 14. Once again, rear mounting tabs 22 may be formed in any of the walls, and are shown for example extending from bottom wall 8 and top wall 12 in FIGS. 3 and 4. In this aspect, rear mounting tabs 22 do not require apertures because of the different mounting method detailed below. Electrical device 16 is again installed using mounting fasteners 18 at mounting channel 42 within the electrical box.

Electrical box 40 includes a pivotable mounting tab 44 proximate open top 14. Specifically, pivotable mounting tab 44 extends from open top 14 and is pivotable or rotatable about a plane parallel to the open top, or across the face of the electrical box opening.

The operation is similar to the fist aspect electrical box, except that the pivotable mounting tab is initially oriented within the plane open top 14 when the electrical box is installed within the opening. The installer locates rear mounting tabs 22 proximate rear surface 34 of mounting wall 30 and then rotates pivotable mounting tab 44 into contact with front surface 32 of mounting wall 30. Accordingly, electrical box 40 is now easily and efficiently held into place on the mounting wall between rear mounting tabs 22 and pivotable mounting tabs 44.

Figure 6:
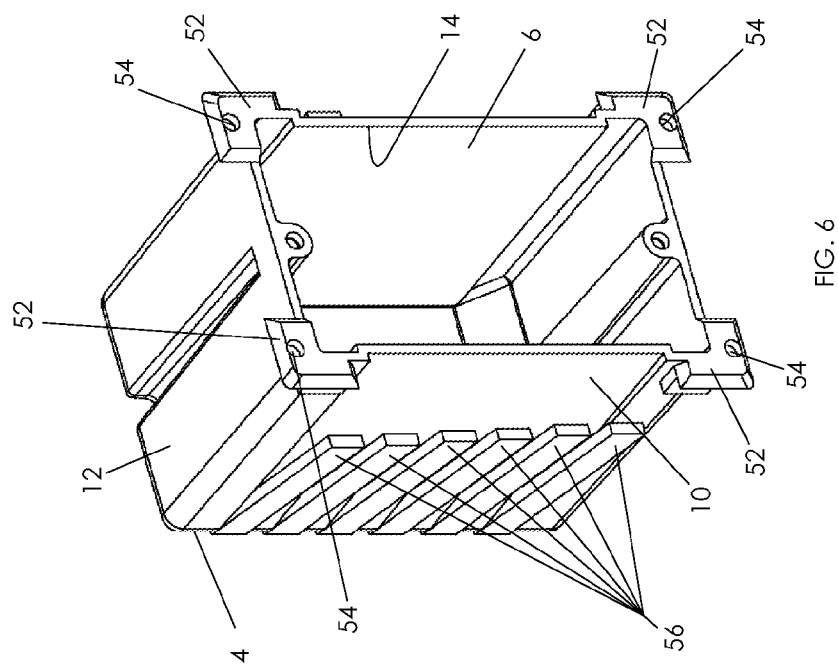
FIG. 6 is a perspective view of an electrical box with mounting fingers.
Figure 5:
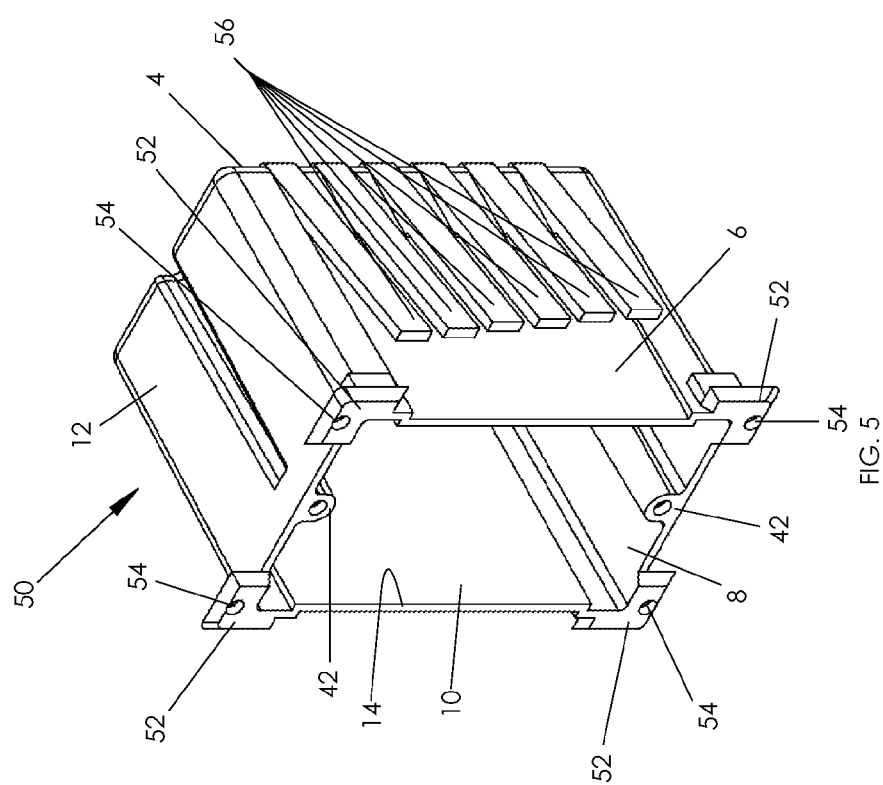
FIG. 5 is a perspective view of an electrical box with mounting fingers.
Figure 7:
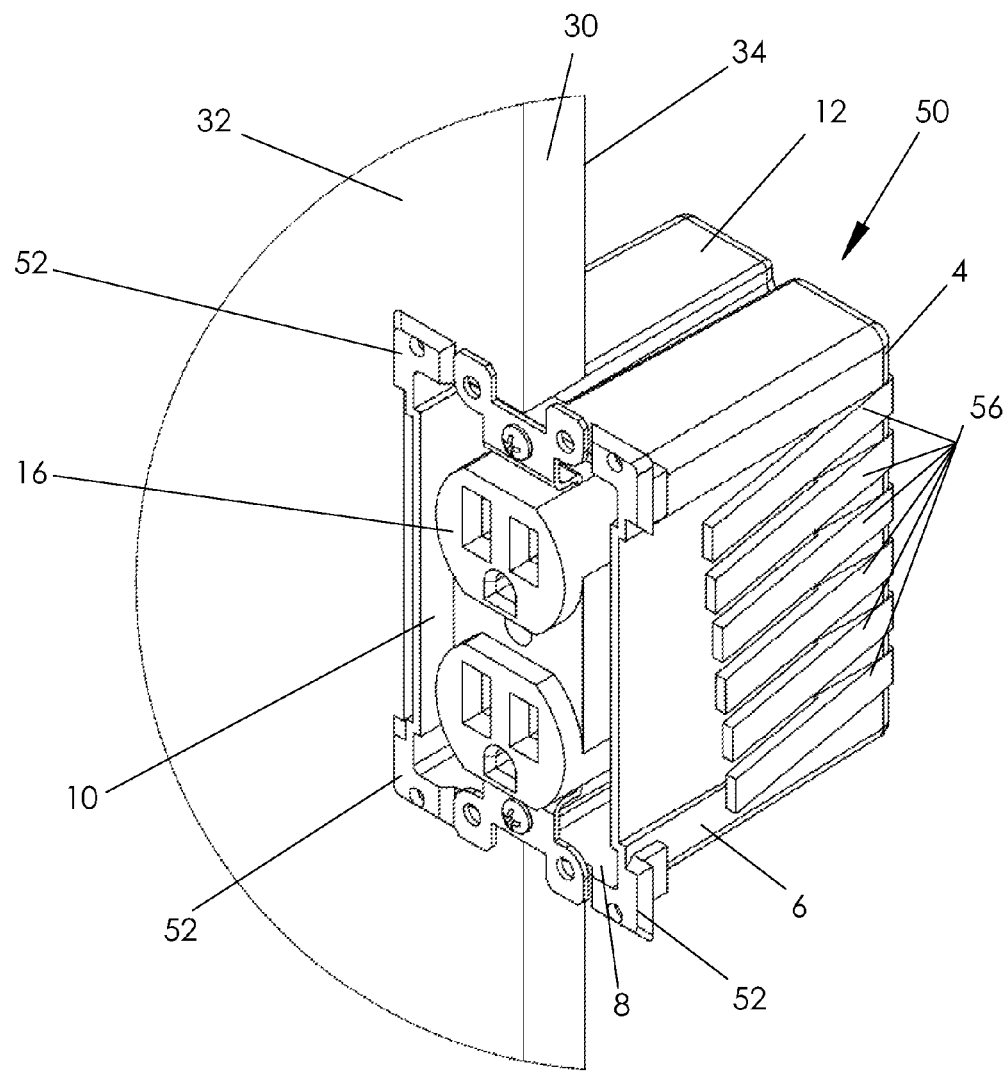
FIG. 7 is a perspective view of an electrical box with mounting fingers mounted on a mounting wall.

FIGS. 5-7 illustrate a third aspect electrical box 50 with back wall 4, right wall 6, bottom wall 8, and a top wall 12 at least partially defining open top 14. Electrical box 50 also includes a plurality of front shoulders 52 with apertures 54 therein. The front shoulders 52 are preferably located at each corner of the electrical box and extend outward beyond the edges of the nearest electrical box walls so that the front shoulders function to stabilize the electrical box within the mounting wall. Although preferably located on the corners, the front shoulders may be located on any portion of the electrical box.

Electrical box 50 also includes a plurality of mounting fingers 56 extending from one or more of the walls. In one implementation, mounting fingers 56 extend from the left and right sides of the electrical box and may connect to the left and right side walls adjacent back wall 4. Still further, mounting fingers 56 may have a variety of different finger lengths to accommodate various mounting wall thicknesses. For example, the thickness of the mounting wall will determine which mounting finger contacts rear surface 34 of mounting wall 30 as the thickness of the mounting wall approximately equals the distance between front shoulders 52 and the mounting fingers. The mounting fingers may be biased to an outward position so that they snap into position behind the mounting wall during installation.

During installation, the installer once again cuts the appropriate size hole for the electrical box in the mounting wall, and the installer then inserts the electrical box into the opening and pushes the electrical box back until the front shoulders contact front surface 32 of the mounting wall. At the same time, shorter mounting fingers 56 are passed behind rear surface 34 of mounting wall 30 until the correct length mounting finger 56 just clears the rear surface and snaps into place. At this time, the correct length mounting finger 56 abuts the rear surface 34 to prevent the electrical box from being pulled out of the wall. Accordingly, the electrical box is held in position by the front shoulders and the mounting tabs for a simple and efficient installation.

In these and in any other embodiments, the electrical box may be made of any materials and fabricated and/or assembled in any manner. For instance the electrical box may be manufactured from various different pieces and then screwed or glued together. In one embodiment for instance the electrical box may be molded in two pieces of plastic which are then ultrasonic welded together.

It will be understood that implementations are not limited to the specific components disclosed herein, as virtually any components consistent with the intended operation of a method and/or system implementation for an electrical box may be utilized. Accordingly, for example, although particular components are disclosed, such components may comprise any shape, size, style, type, model, version, class, grade, measurement, concentration, material, weight, quantity, and/or the like consistent with the intended operation of a method and/or system implementation for an electrical box. Implementations are not limited to uses of any specific components, provided that the components selected are consistent with the intended operation of a method and/or system implementation for an electrical box.

Accordingly, the components defining any electrical box implementation may be formed of any of many different types of materials or combinations thereof that can readily be formed into shaped objects provided that the components selected are consistent with the intended operation of an electrical box implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any electrical box implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The implementations listed here, and many others, will become readily apparent from this disclosure. From this, those of ordinary skill in the art will readily understand the versatility with which this disclosure may be applied.

The invention claimed is:

1. An electrical box comprising:
    at least four walls extending forward from a back wall to an open front, at least two opposing walls of the four walls each comprising a rear mounting tab and a front mounting tab; and,
    wherein each of the rear mounting tabs are rigidly mounted to its respective wall of the at least two opposing walls and each of the front mounting tabs are pivotably mounted to the electrical box.

2. The electrical box of claim 1 wherein each of the rear mounting tabs further comprises at least one mounting aperture.

3. The electrical box of claim 2 wherein the mounting aperture is threaded.

4. The electrical box of claim 2 wherein the front mounting tab further comprises at least one mounting aperture.

5. The electrical box of claim 1 wherein the front and rear mounting tabs are the same width as the at least two opposing walls.

6. The electrical box of claim 1 wherein the front mounting tab pivots from a position generally parallel with the two opposing walls to a position generally perpendicular to the two opposing walls.

7. The electrical box of claim 1 wherein the rear mounting tab is positioned adjacent a mounting wall rear surface.

8. The electrical box of claim 1 wherein the front mounting tab is positioned adjacent a mounting wall front surface.

9. The electrical box of claim 1 wherein a mounting wall is located between the front and rear mounting tabs.

10. The electrical box of claim 1 wherein the front mounting tabs are located on walls opposite the rear mounting tabs.

11. The electrical box of claim 1 wherein the front and rear mounting tabs are located on a top wall and a bottom wall.

12. The electrical box of claim 1 wherein the front mounting tabs define a portion of the open front.

13. The electrical box of claim 1 wherein each of the front mounting tabs are secured to an outer surface of the wall.

14. An electrical box comprising:
    at least four walls extending forward from a back wall to an open front, at least two opposing walls of the four walls each comprising a rear mounting tab and a front mounting tab; and,
    wherein each of the rear mounting tabs are mounted to the wall and each of the front mounting tabs are pivotably mounted to the electrical box.

15. The electrical box of claim 14 wherein each of the front mounting tabs are secured to an outer surface of the wall.

16. The electrical box of claim 14 wherein each of the rear mounting tabs and each of the front mounting tabs further comprise at least one mounting aperture.

* * * * *